United States Patent [19]
Chandler

[11] Patent Number: 5,088,673
[45] Date of Patent: Feb. 18, 1992

[54] CUP ADAPTER FOR USE IN CYLINDRICAL SOCKETS

[76] Inventor: Cynthia Chandler, 114 Elodie Ave., Harahan, La. 70123

[21] Appl. No.: 590,296

[22] Filed: Sep. 28, 1990

[51] Int. Cl.$^5$ .............................................. A47K 1/08
[52] U.S. Cl. ............................ 248/311.2; 215/100 R; 224/42.45 R
[58] Field of Search ............... 248/146, 311.2, 911; 220/426, 85 H; 211/71, 74; 215/100 R; 224/295, 42.45 R, 42.42; D7/70

[56] References Cited

U.S. PATENT DOCUMENTS

| | | | |
|---|---|---|---|
| 2,963,256 | 12/1960 | Borah | 248/346 |
| 3,036,717 | 5/1962 | Johnson | 211/88 |
| 3,881,677 | 5/1975 | Ihlenfeld | 248/311.2 |
| 4,040,549 | 8/1977 | Sadler | 224/29 |
| 4,069,996 | 1/1978 | Koziol | 220/85 H X |
| 4,088,250 | 5/1978 | Schaefer | 220/85 H X |
| 4,324,381 | 4/1982 | Morris | 248/311.2 |
| 4,596,370 | 6/1986 | Adkins | 224/41 X |
| 4,721,216 | 1/1988 | Kinder | 220/85 H X |
| 4,749,162 | 6/1988 | Wanzor | 248/558 |
| 4,765,581 | 8/1988 | Wallace et al. | 248/311.2 |
| 4,844,400 | 7/1989 | Jasmagy, Jr. | 248/311.2 |
| 4,854,468 | 8/1989 | Dahlquist | 215/100 R X |
| 4,896,858 | 1/1990 | Sokolski et al. | 248/311.2 |
| 4,966,303 | 10/1990 | Jones | 220/85 H X |
| 4,974,741 | 12/1990 | Gustafson | 215/100 R X |

*Primary Examiner*—J. Franklin Foss
*Attorney, Agent, or Firm*—Pravel, Gambrell, Hewitt, Kimball & Krieger

[57] ABSTRACT

An adapter for holding an enlarged drinking glass, mug or the like having a socket that is of a larger interval diameter, with a lower pedestal of a smaller outer diameter adapted to fit the console socket of a moving vehicle.

5 Claims, 2 Drawing Sheets

CUP ADAPTER FOR USE IN CYLINDRICAL SOCKETS

BACKGROUND OF THE INVENTION

1. Field of the Invention

The present invention relates to adapters for supporting drinking cups, coffee mugs and like in automobiles, vans, boats and other moving vehicles. Even more particularly, the present invention relates to an improved adapter cup having adaptation to support enlarged drinking cups, vessels, glasses, and the like wherein an adapter has an upper enlarged receptacle for holding large diameter mugs, cups, glasses, and a lower smaller support peg for registering with sockets provided for drinking articles in vans, trucks, automobiles and the like.

2. General Background

Most moving vehicles provide a rectangular or circular socket of for example, a few inches in diameter and one to two (1-2) inches deep for accommodating standard sized drinking articles, such as aluminum drink cans, standard disposable glass sized bottles, (e.g. ten to twelve ounce) and the like. However, some drinking articles such as insulated coffee mugs, and the foam insulation wraps that are provided to go around aluminum cans, are such an enlarged outer diameter that they do not fit the majority of sockets that are provided in an automobile, truck, boat, or the like.

Therefore, there is a need for a simple, easy to use, easy to manufacture, adapter that fits the receptacle or socket on a vehicle, and yet which provides an enlarged upper diameter receptacle for accommodating oversized drinking articles, such as very large mugs, insulating jackets that go around cans and bottles, and the like.

SUMMARY OF THE PRESENT INVENTION

The system of the present invention solves the prior art shortcomings and problems by providing an improved adapter apparatus that fits smaller console sockets on moving vehicles wherein larger diameter drinking vessels, coffee cups, mugs and the like can be contained above a console socket of a smaller diameter.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
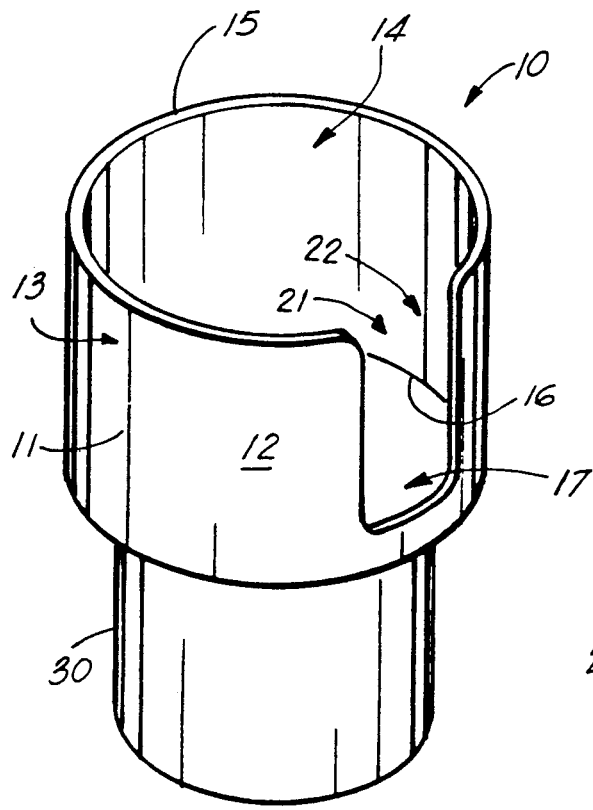
FIG. 1 is a perspective view of the preferred embodiment of the apparatus of the present invention.
Figure 4:
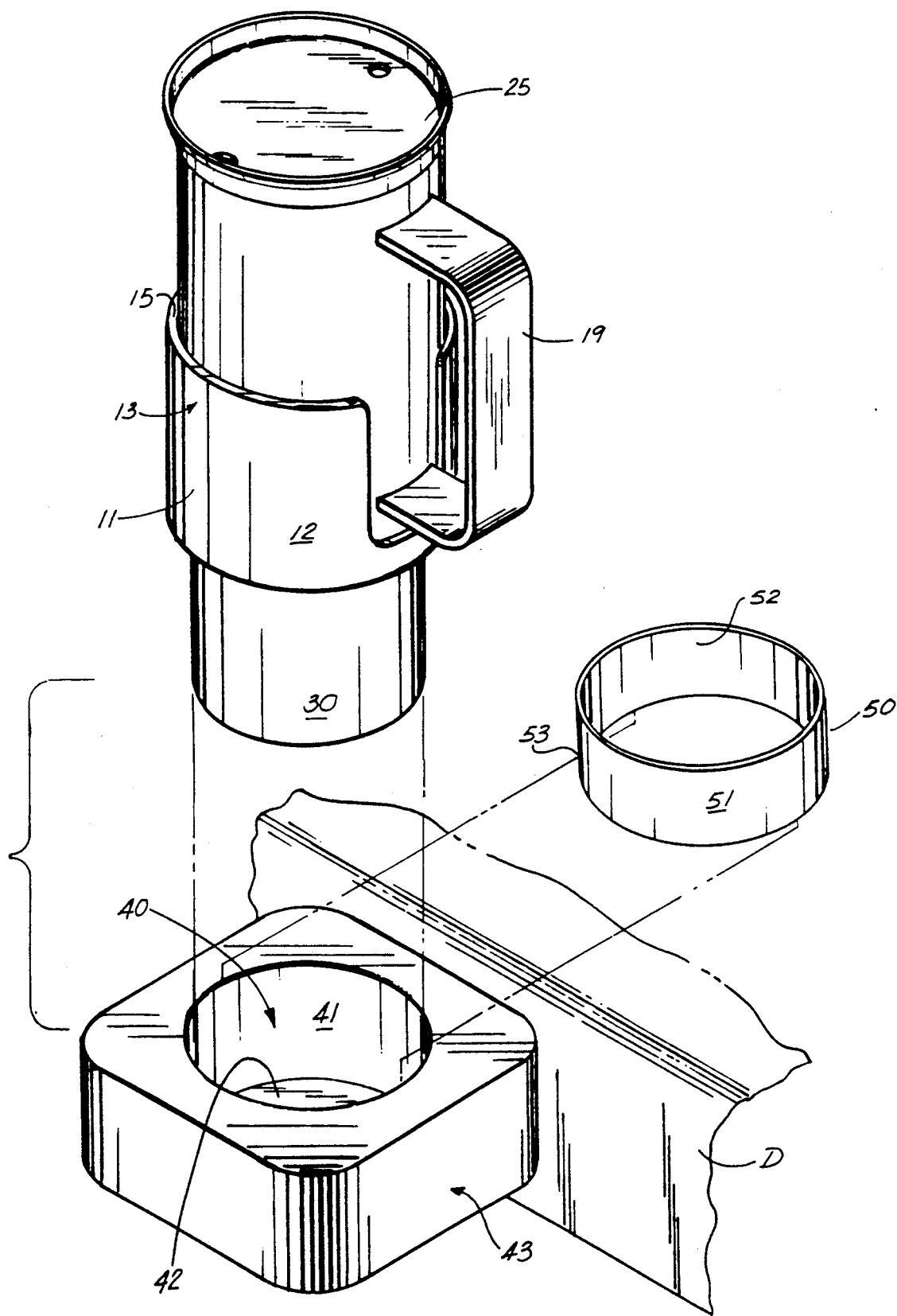
FIG. 4 is an exploded perspective view of the preferred embodiment of the apparatus of the present invention.

FIGS. 1-4 illustrate generally the preferred embodiment of the apparatus of the present invention designated generally by the numeral 10. In FIG. 1, adapter 10 includes an upper enlarged portion 11 and a lower smaller portion 12. The upper portion 11 is generally cylindrical having an outer continuous side wall 12, and outer surface 13 and an inner surface 14, The side wall terminates at upper edge 15 and at its bottom edge communicates at 16 with floor 17. Floor 17 is generally circular and defines a stop for the placement of a drinking vessel such as can 20 thereon. A generally rectangular cutout 20 and 21 in side wall 11 provides an open top 22 so that a handle 19 of mug 25 can be placed in and registered with the socket 21 as shown in FIG. 4.

Figure 2:
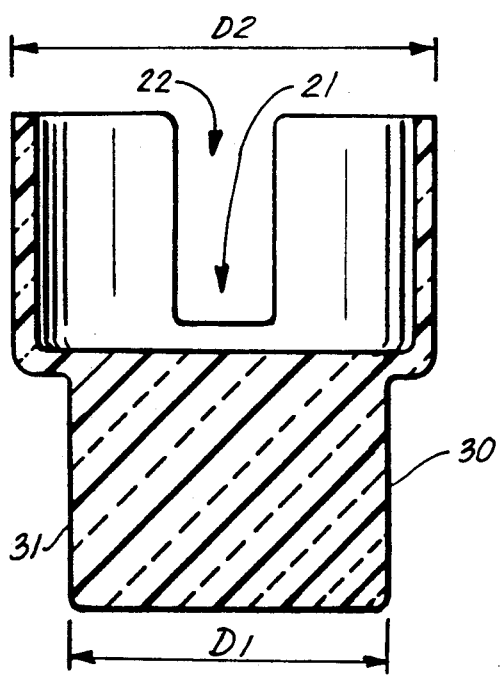
FIG. 2 is a sectional view of the preferred embodiment of the apparatus of the present invention.
Figure 3:
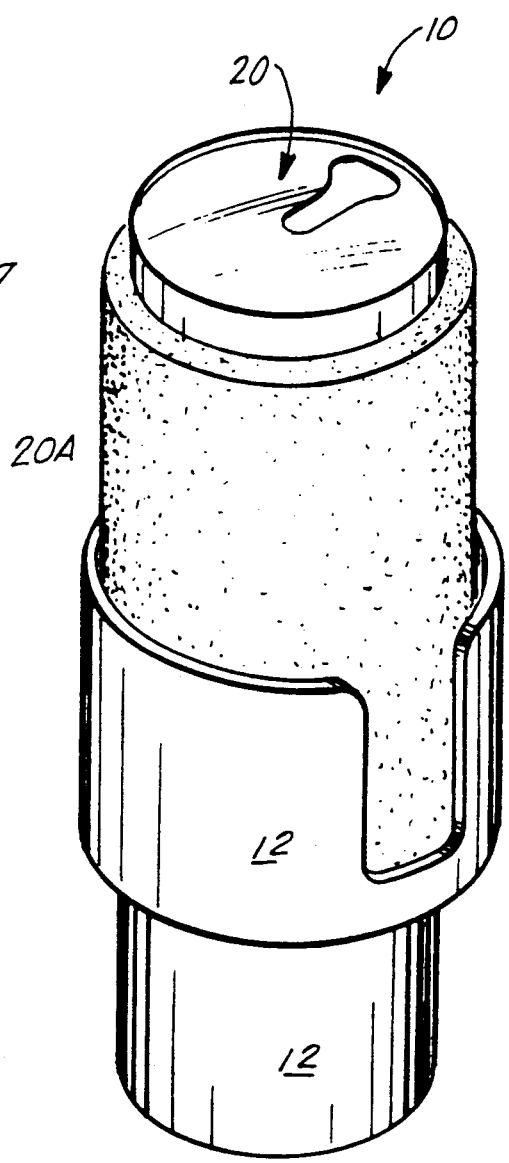
FIG. 3 is a perspective view of the preferred embodiment of the apparatus of the present invention illustrating its use with an insulated wrap about a medal drinking container.

The lower portion 12 defines a cylindrical pedestal having a bottom 30, and a continuous outer cylindrical side wall 31. The pedestal 30 is preferably solid as shown in FIG. 2 in section so that it is weighted providing a lower center of gravity. During use, the lower portion 30 is placed in a socket or receptacle 40 of an automobile or other moving vehicle. Socket 40 is preferably cylindrical providing an inner cylindrical side wall 41 and a generally flat bottom 42 and outer side wall 43. However, side wall 43 can be affixed to an automobile dash designated generally by the numeral 3. Sleeve 50 is preferably cylindrical providing a cylindrical side wall 51, and inner surface 52, and an outer surface 53 with the sleeve being an adapter that fits over lower portion 30.

The lower portion 30 thus provides an outer diameter D1 that is substantially the same as the inner diameter of sleeve 50. The outer diameter of sleeve 50 can be varied for allowing the lower portion 30 to have a variable diameter in order to closely fit a number of differing receptacles 40 in different automobiles, and other vehicles. The inner diameter D2 of upper portion 11 is of a diameter that is larger than the outer diameter D1 of portion 30. This allows drinking vessels, such as can 20 when surrounding by insulated wrap 20A and mug 25 to be of a larger diameter than the diameter of the socket 40, which is provided in the vehicle.

Therefore, the present invention provides a simply straightforward yet workable solution to the problem of enlarging the capacity of the existing socket 40 in a particular moving vehicle. The use of sleeves 50 of differing diameters can be provided with lower portion 30 in kit form, so that a wide variety of sizes can be given for the dimension D1. Similarly, cylindrical sleeves can be added to the interior 14 of upper portion 11 so that its inner diameter D2 can be slightly adjusted in order to closely fit a particular drinking vessel 20, 25.

Because many varying and different embodiments may be made within the scope of the inventive concept herein taught, and because many modifications may be made in the embodiments herein detailed in accordance With the descriptive requirement of the law, it is to be understood that the details herein are to be interpreted as illustrative and not in a limiting sense.

What is claimed as invention is:

1. A generally cylindrical adapter for use with enlarged generally cylindrical drinking articles such as enlarged mugs, insulated drinking articles and the like comprising:
   a) an enlarged receptacle member having an uppermost outer vertical side wall circumferenting a cylindrical socket, and the socket having a central vertical axis;
   b) a lower, smaller diameter pedestal with a vertical axis and having an outer diameter that is smaller than the inner diameter of the socket, the upper portion of the pedestal having an annular shoulder that communicates with the top portion of the receptacle member;

c) the upper side wall including a slot that is open at its top portion for accommodating a handle of a mug; and d) removable sleeve means affixable to the pedestal for adapting the pedestal to a rectangular or cylindrical receptacle of a moving vehicle; and wherein the receptacle and pedestal axes are vertically aligned.

2. The apparatus of claim 1 wherein the uppermost receptacle side wall is cylindrical.

3. The apparatus of claim 1 wherein the pedestal is cylindrical.

4. The apparatus of claim 1 wherein the receptacle sidewall has a generally vertical slot therein with an open top end portion.

5. The apparatus of claim 1 wherein the annular shoulder is generally flat and connects the receptacle side wall and the lower pedestal.

* * * * *